Oct. 10, 1967  P. R. JONES  3,346,156
MOTORCYCLE BAG MOUNTING APPARATUS
Filed Oct. 31, 1966
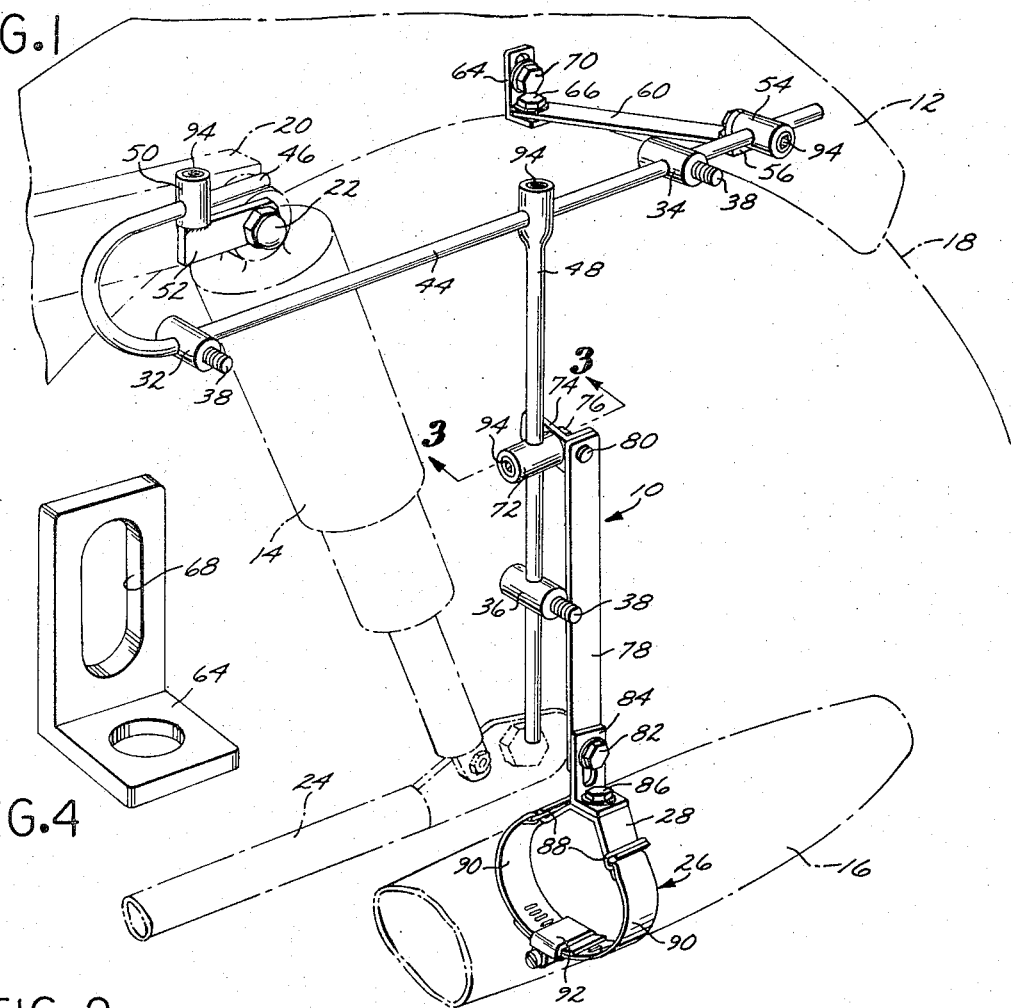
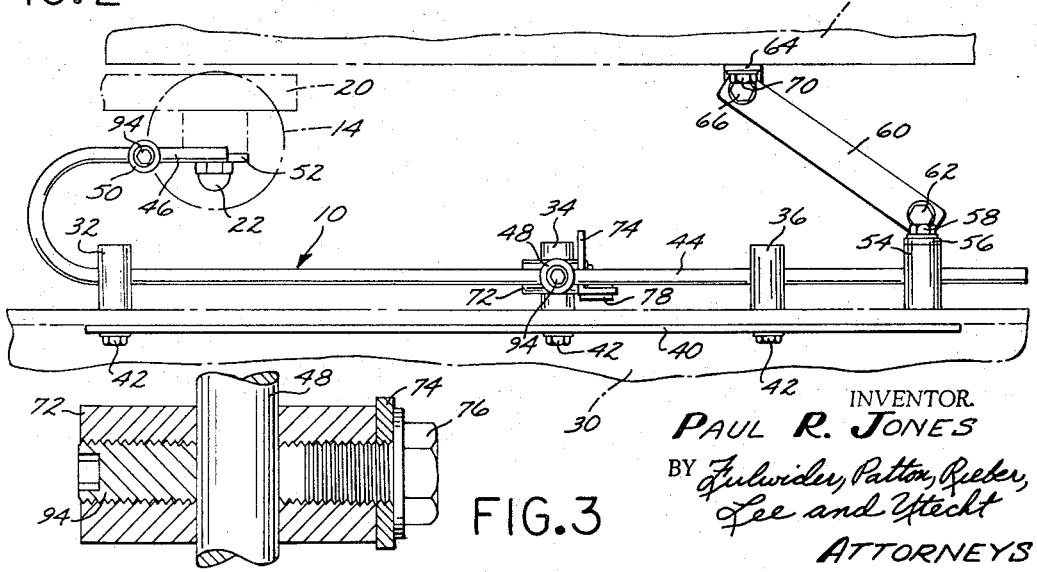
INVENTOR.
PAUL R. JONES
BY Fulwider, Patton, Rieber, Lee and Utecht
ATTORNEYS 3,346,156
MOTORCYCLE BAG MOUNTING APPARATUS
Paul R. Jones, Norwalk, Calif., assignor to Bates Industries, Inc., Long Beach, Calif., a corporation of California
Filed Oct. 31, 1966, Ser. No. 590,631
8 Claims. (Cl. 224—32)

The present invention relates to a motorcycle bag mounting apparatus, and more particularly to such an apparatus which is adapted for universal attachment to different types of motorcycle.

It is common practice to mount containers or saddle bags to motorcycles on opposite sides of the rear wheel. Such bags are generally made of fiberglass and are attached by various straps, bolted connections, and the like, all varying according to the configuration of the particular motorcycle. The variety of attachment points available on the different types of motorcycle has heretofore resulted in a correspondingly large number of different sizes and configurations of bag mounting devices being stocked by each manufacturer. The manufacture, cataloging, stocking, and distribution of the many bag mounting devices have undesirably raised the ultimate costs to the consumer.

Accordingly, it is an object of the present invention to provide a universal motorcycle bag mounting apparatus which can be used to mount a motorcycle bag to any one of a great number of different sizes and configurations of motorcycles. The present universal apparatus eliminates any need for stocking more than one type or style of bag mounting apparatus for most applications.

Another object of the invention is to provide an apparatus of the aforementioned character which is adapted to be quickly mounted to a motorcycle, and which is rugged in construction and relatively inexpensive to manufacture.

A further object of the invention is to provide such an apparatus in which both the connections of the apparatus to the bag, and the connections of the apparatus to the motorcycle, are adjustable in both fore-and-aft and vertical directions for alignment of the apparatus with the attachment points on the bag.

Other objects and features of the invention will become apparent from consideration of the following description taken in connection with the accompanying drawings, in which:

FIG. 1 is a perspective view of the present motorcycle bag mounting apparatus in position for attachment to a typical bag and motorcycle, portions of the motorcycle being shown in phantom outline;

FIG. 2 is a plan view of the apparatus of FIG. 1, with a portion of the motorcycle bag being shown in phantom outline;

FIG. 3 is an enlarged view taken along the line 3—3 of FIG. 1; and

FIG. 4 is an enlarged detail view of a bracket forming a part of the rearward support means of the apparatus.

Referring now to the drawings, there is illustrated a motorcycle bag mounting apparatus 10 adapted for mounting to a variety of different sizes, types, and configurations of motorcycle. The showing in FIGS. 1 and 2 is a typical mounting of the apparatus 10 to the rear fender or mud guard 12, shock absorber 14, and exhaust muffler 16 of a motorcycle.

The mud guard 12 overlies a rear tire 18 and is attached to a frame element 20 of the motorcycle frame. The frame element 20 also is the attachment point at which the upper end of the shock absorber 14 is supported by a nut and bolt assembly 22, the lower part of the shock absorber 14 being similarly supported by another frame element 24, as best illustrated in FIG. 1.

The exhaust muffler 16 is secured in any suitable manner to the motorcycle and mounts a strap 26 and bracket element 28 which afford a means for connection of the mounting apparatus 10 to the exhaust muffler 16, as will be seen.

Normally two of the mounting apparatuses 10 are utilized on a motorcycle, one on each side of the rear wheel 18, and secured to such attachment points on the motorcycle as are available. The apparatus 10 can be used on either side of the motorcycle to mount a saddle bag 30, the manner of mounting the saddle bag on the left side of the motorcycle being illustrated in FIG. 2.

Although not illustrated in detail, the conventional saddle bag 30 is made of fiberglass, is substantially rigid in construction, and is provided with a plurality of openings by which the bag 30 is mounted in position, as will be described subsequently. The mounting apparatus 10 is also adapted for association with bags 30 which are made of other materials, such as leather, plastic, or the like.

The mounting apparatus 10 comprises, generally, forward, rearward, and lower bag mounts 32, 34, and 36, respectively, which are adapted for attachment to the saddle bag 30. The forward and rearward bag mounts 32 and 34 are longitudinally spaced apart and substantially horizontally aligned. The lower bag mount 36 is located below and generally intermediate the pair of mounts 32 and 34.

Each of the mounts 32, 34, and 36 includes an outwardly projecting threaded portion or stud 38 for disposition within three complemental openings provided in the bag 30. As best viewed in FIG. 2, the studs 38 normally also pass through one or more metal reinforcing plates 40 located within the bag 30 and against the inner face of the bag wall. The mounts are secured in position by nuts 42 tightened upon the studs 38. Alternatively, the mounts 32, 34, and 36 could each be provided with a threaded bore, if desired, and bolts then disposed through the bag for threaded association with the threaded bores of the mounts.

An elongated, substantially horizontal support member or rod 44 of circular cross-section is slidably disposed through complemental transverse bores provided in the forward and reaward bag mounts 32 and 34, and the forward extremity of the rod 44 is reversely formed to define a rearwardly directed rod segment 46. The purpose of the reversely formed construction will become apparent later in the description.

An elongated, substantially vertical support member or rod 48 of circular cross-section is slidably disposed through a complemental transverse bore provided in the lower bag mount 36, the upper extremity of the rod 48 being enlarged and also provided with a transverse or horizontally oriented bore to slidably receive the horizontally oriented bore to slidably receive the horizontal support rod 44 at approximately the mid-portion thereof.

Because of the circular configuration of the support rods 44 and 48 and the like configuration of the bores in the bag mounts 32, 34, and 36, the bag mounts are adapted not only to slide along but also to pivot about the axis of their respective support rod. This arrangement adapts the apparatus 10 for association with various types of bags 30 in which the mounting openings for the bag mounts 32, 34, and 36 might be differently spaced and arranged.

The rod segment 46 of the horizontal support rod 44 is longitudinally slidably disposed through a transverse opening or bore provided in a forward bracket mount 50.

The bore is circular in cross-section so that the main body of the horizontal support rod 44 can be pivoted about the longitudinal axis of the segment 46, and toward and away from the forward bracket mount 50.

The mount 50 is welded or otherwise rigidly secured to one end of a short plate 52. The other end of the plate 52 includes an opening through which is disposed the bolt of the nut and bolt assembly 22, tightening of the nut of the assembly 22 thereby securing in position not only the upper end of the shock absorber 14 but also the plate 52.

The opposite or rearward extremity of the horizontal support rod 44 is longitudinally slidably disposed through a transverse bore provided in a rearward bracket mount 54 which is identical to the mount 50. One leg of an L-shaped angle clip 56 is secured to the rearward bracket mount 54 by a bolt 58, the other leg of the clip 56 being similarly secured to one end of an elongated metal strap 60 by a bolt 62. The opposite end of the strap 60 is secured to one leg of an angle clip 64 by a bolt 66. As best viewed in FIGS. 1 and 4, the other leg of the clip 64 includes a vertically elongated opening 68 through which a bolt 70 is disposed for securement of the clip 64 to the mud guard 12. The vertical elongation of the opening 68 affords a vertical adjustment of the position of the clip 64, as will be apparent.

The vertical support rod 48 is vertically slidably disposed through a transverse opening or bore provided in a lower bracket mount 72, the bore being circular in cross-section so that the mount 72 is pivotable about the longitudinal axis of the vertical support rod 48.

One leg of an angle clip 74 is secured to the lower bracket mount 72 by a bolt 76, the other leg of the clip 74 being secured to the upper extremity of an elongated metal strap 78 by a bolt 80.

The opposite extremity of the strap 78 is secured by a bolt 82 to one leg of an angle clip 84 which has a vertically elongated opening identical to the opening 68 in the clip 64, also for vertical adjustment. The other leg of the clip 84 is secured by a bolt 86 to the U-shaped bracket element 28.

The opposite legs of the bracket 28 are each reversely bent to receive a pair of wire loops 88 carried at the ends of a pair of strap sections 90 forming a part of the strap 26. The other ends of the sections 90 are clamped together by a conventional screw and rack fitting 92 to securely clamp the strap 26 about the periphery of the exhaust muffler 16.

Once the various components of the mounting apparatus 10 are properly positioned for attachment to the motorcycle, the various bolts are tightened to fix the saddle bag 30 in position. In this regard, the bolts may be threaded into the associated strap 60 or 78, as the case may be, if the strap is sufficiently thick, or alternatively a nut (not shown) may be mounted upon the protruding threaded end of the bolt.

The bracket mounts 50, 54, and 72 are each rigidly secured to their respective support rods by a set screw 94 threadedly carried by the bracket mount and engaging the adjacent support rod. FIG. 3 is exemplary of this arrangement, the set screw 94 being threadedly carried by the lower bracket mount 72 and engaging the vertical support rod 48 to rigidly clamp the bracket mount 72 in adjusted position upon the support rod 48. A similar set screw 94 is threadedly carried by the upper end of the vertical support rod 48 to rigidly clamp the rod 48 in its adjusted position along the length of the horizontal support rod 44.

In certain installations, such as in the mounting of a leather bag 30, the lower opening in the bag and the lower bag mount 36 could be eliminated. Instead, a leather strap (not shown) can be fastened to the lower part of the bag and also disposed about and secured to a portion of the present apparatus 10, such as about the vertical rod 48 or the strap 78.

Another variation in the apparatus 10 would be elimination of the muffler mounting strap 26 and bracket 28 where the bag 30 was to be mounted to a single muffler motorcycle on the side opposite the location of the muffler. In this situation the bracket 78 is merely reoriented to locate the clip 84 adjacent the clip 64. The bolt 70 is then utilized to secure both clips 64 and 84 in position. It will be apparent that the universality of movement of component parts of the apparatus 10 adapt the apparatus 10 to these and various other mounting arrangements to suit the requirements of many different types of motorcycle.

In summary, the mounting apparatus 10 is quickly attached to the motorcycle by clamping the strap 26 upon the exhaust muffler 16, mounting the plate 52 upon the nut and bolt assembly 22 which holds the upper end of the shock absorber 14 in position, and bolting the clip 64 to the mud guard 12 by means of the bolt 70. The fore-and-aft position of the saddle bag 30 is adjusted by movement of the bag mounts 32 and 34 along the horizontal support rod 44, and the vertical position of the saddle bag is adjusted by movement of the bag mount 36 along the vertical support rod 48. The bracket mounts 50, 54, and 72 are similarly adjustable upon the support rods to accommodate the apparatus 10 to the particular points of attachment of the apparatus 10 to the motorcycle. In this regard, the articulated character of the straps 60 and 78 in combination with their associated angled clips further facilitates accommodation of the mounting apparatus 10 to the available attachment points on the motorcycle.

From the foregoing, it will be apparent that the mounting apparatus 10 is universal in character, being adapted for attachment to differently located attachment points on various types of motorcycles.

Various modifications and changes may be made with regard to the foregoing detailed description without departing from the spirit of the invention or the scope of the following claims.

I claim:
1. A motorcycle bag mounting apparatus comprising:
   lower, forward and rearward bag mounts adapted for attachment to a motorcycle bag, said forward and rearward bag mounts being longitudinally spaced apart;
   an elongated, substantially horizontal support member mounting said forward and rearward bag mounts;
   an elongated, substantially vertical support member, the upper extremity of said vertical support member being carried by and horizontally adjustably movable upon said horizontal support member;
   forward, rearward, and lower bracket mounts, said forward and rearward bracket mounts being carried at opposite extremities of and horizontally adjustably movable upon said horizontal support member, said lower bracket mount being carried by and vertically adjustably movable upon said vertical support member; and
   forward, rearward, and lower support means adapted for attachment to a motorcycle and connected, respectively, to said forward, rearward, and lower bracket mounts for mounting a saddle bag upon the motorcycle, whereby the fore-and-aft location of the saddle bag is adjustable by relative movement between said forward and rearward bracket mounts and said forward and rearward bag mounts, and the vertical location of the saddle bag is adjustable by relative movement between said lower bracket mount and said lower bag mount.

2. A motorcycle bag mounting apparatus according to claim 1 and including a lower bag mount located below said forward and rearward bag mounts, and wherein said lower bag mount is mounted to said vertical support member.

3. A motorcycle bag mounting apparatus according to claim 2 wherein said forward and rearward bag mounts are horizontally adjustably movable upon said horizontal support member, and said lower bag mounted is vertically adjustably movable upon said vertical support member whereby the location of said bag mounts is adjustable for mounting a motorcycle bag having differently located mounting openings for said bag mounts.

4. A motorcycle bag mounting apparatus according to claim 1 wherein the forward extremity of said horizontal support member is reversely formed to provide a rearwardly directed segment, and wherein said segment mounts said forward bag mount for relative pivotal movement about a horizontal axis whereby the motorcycle bag may be pivoted toward and away from the motorcycle.

5. A motorcycle bag mounting apparatus according to claim 2 wherein said forward and rearward bag mounts and bracket mounts are pivotable about the axis of said horizontal support member, and said lower bag mount and bracket mount is pivotable about the axis of said vertical support member, whereby the bag mounting apparatus is adapted for connection of said forward, rearward, and lower support means to different attachment points on the motorcycle.

6. A motorcycle bag mounting apparatus according to claim 5 wherein said horizontal support member and said vertical support member are rods of circular cross-section.

7. A motorcycle bag mounting apparatus according to claim 2 wherein each of said forward, rearward, and lower support means is constituted of articulated components adapted for relative movement for universal attachment to different motorcycles having different points for said attachment.

8. A motorcycle bag mounting apparatus comprising:
forward, rearward, and lower bag mounts adapted for attachment to a motorcycle bag, said forward and rearward bag mounts being longitudinally spaced apart and said lower bag mount being located below said forward and rearward bag mounts, each of said bag mounts including a transverse bore therethrough;

an elongated, substantially horizontal support rod of circular cross-section slidably disposed through the bores of said forward and rearward bag mounts;

an elongated, substantially vertical support rod of circular cross-section slidably disposed through the bore of said lower bag mount, the upper extremity of said vertical support rod including a horizontally oriented bore therethrough slidably carrying said horizontal support rod;

forward, rearward, and lower bracket mounts, each including a transverse bore therethrough, the opposite extremities of said horizontal support rod being slidably carried in the bores of said forward and rearward bracket mounts, and said vertical support rod being slidably carried in the bore of said lower bracket mount; and forward, rearward, and lower support means adapted for attachment to a motorcycle and connected, respectively, to said forward, rearward, and lower bracket mounts for mounting a saddle bag upon the motorcycle, each of said means including articulated components adapted for relative movement for universal attachment of said motorcycle bag mounting apparatus to different motorcycles having different points for said attachment.

References Cited
UNITED STATES PATENTS 669,677 3/1901 Bray _____ 224—40
2,850,221 9/1958 Brechwald _____ 224—32

GERALD M. FORLENZA, *Primary Examiner.*

R. J. SPAR, *Assistant Examiner.*